United States Patent
Hayasaka et al.

(10) Patent No.: US 9,400,554 B2
(45) Date of Patent: Jul. 26, 2016

(54) INFORMATION DISPLAY SYSTEM INCLUDING TRANSMISSION TYPE HMD, NON-TRANSITORY COMPUTER-READABLE STORAGE MEDIUM AND DISPLAY CONTROL METHOD

(71) Applicant: Konica Minolta, Inc., Tokyo (JP)

(72) Inventors: Mitsuharu Hayasaka, Tokyo (JP); Masahiro Ozawa, Tokyo (JP); Takahisa Matsunaga, Tokyo (JP); Hiroshi Nogawa, Tokyo (JP); Yasufumi Aoyama, Tokyo (JP); Kunikazu Aoyama, Tokyo (JP); Tetsuren Nogawa, Tokyo (JP)

(73) Assignee: KONICA MINOLTA, INC. (JP)

( * ) Notice: Subject to any disclaimer, the term of this patent is extended or adjusted under 35 U.S.C. 154(b) by 94 days.

(21) Appl. No.: 14/533,018

(22) Filed: Nov. 4, 2014

(65) Prior Publication Data
US 2015/0123997 A1    May 7, 2015

(30) Foreign Application Priority Data
Nov. 7, 2013   (JP) .................................. 2013-230874

(51) Int. Cl.
*G06F 3/01*   (2006.01)
*G02B 27/01*   (2006.01)

(52) U.S. Cl.
CPC ............ *G06F 3/013* (2013.01); *G02B 27/0101* (2013.01); *G02B 27/017* (2013.01); *G02B 2027/014* (2013.01); *G02B 2027/0178* (2013.01); *G02B 2027/0187* (2013.01)

(58) Field of Classification Search
CPC ... G06F 3/013; G02B 27/0101; G02B 27/017
See application file for complete search history.

(56) References Cited

U.S. PATENT DOCUMENTS

| 2015/0103003 A1* | 4/2015 | Kerr | G06F 3/013 345/158 |
| 2015/0109797 A1* | 4/2015 | Jurik | F21V 11/18 362/321 |

FOREIGN PATENT DOCUMENTS

JP    04698002    3/2011

* cited by examiner

*Primary Examiner* — Maurice L McDowell, Jr.
*Assistant Examiner* — Raffi Isanians
(74) *Attorney, Agent, or Firm* — Squire Patton Boggs (US) LLP

(57) ABSTRACT

Provided are an information display system, a non-transitory computer-readable storage medium, and a display control method. The information display system includes a transmission type head-mounted display and a control section. The control section includes a gaze point detecting section configured to detect a point of gaze of a user, a first judgment section configured to judge whether the user gazes at a certain area on a virtual screen or on the background beyond the virtual screen, a second judgment section configured to judge whether a sight-line region around the intersection of the virtual screen and a sight line of the user overlaps with an object displayed on the virtual screen, and a display control section configured to, in response to a movement of the point of gaze, change at least one of a display position and a display mode of the object on the basis of judgment results.

14 Claims, 11 Drawing Sheets

FIG. 5

| PROPERTY | DESCRIPTION |
|---|---|
| 1 | INFORMATION INTENDED TO BE DISPLAYED SO AS TO BE SUPERIMPOSED ON THE BACKGROUND (EX. IDENTIFICATION RESULT OF A SUBSTANCE OR BUILDING EXISTING IN THE BACKGROUND) |
| 2 | INFORMATION TO BE DISPLAYED REGARDLESS OF THE BACKGROUND (EX. DOCUMENT, PICTURE, MOVING IMAGE, ETC.) |

FIG. 6

| OBJECT | PROPERTY | DISPLAY CHANGE FLAG | COORDINATES OF ORIGINAL DISPLAY POSITION |
|---|---|---|---|
| OBJECT A | 1 | true | – |
| OBJECT B | 2 | False | – |
| OBJECT C | 2 | true | (80,300) |
| ... | ... | ... | ... |

INFORMATION DISPLAY SYSTEM INCLUDING TRANSMISSION TYPE HMD, NON-TRANSITORY COMPUTER-READABLE STORAGE MEDIUM AND DISPLAY CONTROL METHOD

This application is based on Japanese Patent Application No. 2013-230874 filed on Nov. 7, 2013, in the Japan Patent Office, the entire content of which is hereby incorporated by reference.

TECHNICAL FIELD

The present invention relates to an information display system, a non-transitory computer-readable storage medium storing a display control program, and a display control method. In particular, the present invention relates to an information display system including a transmission type HMD, a non-transitory computer-readable storage medium storing a display control program to control the display of the transmission type HMD, and a display control method of the transmission type HMD.

BACKGROUND

In recent years, as miniaturization of devices, such as a sensor, advances, development of wearable transmission type HMDs (Head-Mounted Displays) called, for example, a smart glass becomes more active. Generally, an information display system using such a transmission type HMD projects or displays information as an information image on a transparent virtual screen (a lens or lenses of glasses, or a glass or plastic material on the front surface of sunglasses or goggles), so that a wearing person (user) can confirm the information while looking at the background. That is, one of the features of the transmission type HMD is to be able to display (superimposing display) an information image while superimposing the information image on the background being an ambient environment.

However, conventional transmission type HMDs have a problem that the information image displayed on a virtual screen becomes an obstacle for a view field of a wearing person (user) depending on the position of a sight line of the user, which is a problem coming from the feature to perform the superimposing display. Some techniques for avoiding this problem have been proposed.

As an example of a technique to project and/or display an information image on a transparent virtual screen, which is not a technique relating to a wearable transmission type HMD, Japanese Examined Patent Application Publication (JP-B) No. 04698002 discloses a display apparatus for use in a vehicle. The display apparatus is configured to detect a sight-line direction of a driver and to judge whether information to be recognized by the driver is information of a predetermined kind or information other than that. The display apparatus is further configured to, when having acquired the information of the predetermined kind (such as alarm information for the driver and vehicle control information indicating that vehicle control is being performed), set the display position of an image of the information to be displayed by a display unit, on the windscreen and on or around the axis of the sight-line direction of the driver, on the basis of the judged kind of the information and the sight-line direction of the driver. The display apparatus is further configured to, when having acquired the other kind of information (such as information relating to information provision other than the alarm information and the vehicle control information), set the display position of the image of the information at a predetermined base display position on the windscreen.

However, in the above conventional technique, the display position of an information image on the virtual screen is set at either one of the vicinity of the position of a sight line and the base display position in accordance with the kind of the information, and the base display position is fixed. The reason why such control is performed is that the above conventional technique conceives the application for HUD (Head-Up Display) in a vehicle and includes implicitly a precondition that the base display position does not become an obstacle for a view field of a driver. Accordingly, for example, in the case where a user wants to refer to the background located beyond the information image displayed at the base display position on the virtual screen, the display of the information image cannot be prevented from becoming an obstacle for the view field of the user.

For such a problem, a considerable method is to shift an information image overlapping with the position of a sight line on the virtual screen. However, if the information image overlapping with the position of a sight line is merely shifted on the virtual screen, it may bring a result contrary to a user's intention.

For example, when a user gazes on the background (peripheral environment) located farther than an information image on the virtual screen, the displayed information image may become an obstacle for the view field of the user. However, when a user gazes at an information image on the virtual screen, the shift of the display position of the information image makes a user's confirmation of the information image difficult. That is, it is necessary to judge whether an information image on the virtual screen is to be shifted, on the basis of a gaze position of the user. Therefore, with the control in which an information image is shifted uniformly without making such a judgment, a transmission type HMD hardly displays an information image appropriately while securing a view field of a user properly.

Further, when an image of information having no (or low) relevance to the background is being displayed, it is considered that the shift of the display position of the information image causes no problem. However, when an image of information intended to be superimposed on the background is being displayed, the shift of the display position of the information image can impair the value of the information. That is, it is necessary to judge whether or not an image of information displayed on the virtual screen is to be shifted, depending on the kind of information. Therefore, with the control in which an information image is shifted uniformly without making such a judgment, a transmission type HMD hardly displays an information image appropriately while securing a view field of a user properly. The present invention seeks to solve the problem.

SUMMARY

In view of the above-described problem, there are disclosed illustrative information display systems including a transmission type HMD, non-transitory computer-readable storage media each storing a display control program, and display control methods.

An illustrative information display system reflecting one aspect of the present invention is an information display system comprising a transmission type head-mounted display and a control section for controlling the transmission type head-mounted display. The transmission type head-mounted display includes a display and projection section configured to display an object on a virtual screen with superimposing the object on a background; and an imaging section configured to take an image of both eyes of a user. The control section includes a gaze point detecting section configured to detect a point of gaze of the user by using image data of the both eyes of the user taken by the imaging section; a first judgment section configured to, by using the point of gaze, judge whether the user gazes at a certain area on the virtual screen or the user gazes on a background beyond the virtual screen; and a second judgment section configured to judge whether a sight-line region overlaps with a display position of the object on the virtual screen or not, where the sight-line region is a region around an intersection of the virtual screen and a line connecting a midpoint of the both eyes and the point of gaze. The control section further includes a display control section configured to, in response to a movement of the point of gaze, make a change of the object in at least one of a display position and a display mode on a basis of judgment results of the first judgment section and the second judgment section.

A non-transitory computer-readable medium reflecting one aspect of the present invention stores a display control program to be executed in a control apparatus for controlling a transmission type head-mounted display. The transmission type head-mounted display includes a display and projection section configured to display an object on a virtual screen with superimposing the object on a background; and an imaging section configured to take an image of both eyes of a user. The display control program, when being executed by a processor of the control apparatus, causes the processor to perform processes comprising: detecting a point of gaze of the user by using image data of the both eyes of the user taken by the imaging section; making a first judgment, by using the point of gaze, whether the user gazes at a certain area on the virtual screen or the user gazes on a background beyond the virtual screen; and making a second judgment whether a sight-line region overlaps with a display position of the object on the virtual screen or not, where the sight-line region is a region around an intersection of the virtual screen and a line connecting a midpoint of the both eyes and the point of gaze. The processes further comprises, in response to a movement of the point of gaze, making a change of the object in at least one of a display position and a display mode on a basis of results of the first judgment and the second judgment.

A display control method reflecting one aspect of the present invention is a display control method of a transmission type head-mounted display including a display and projection section configured to display an object on a virtual screen with superimposing the object on a background and an imaging section configured to take an image of both eyes of a user. The display control method comprises: detecting a point of gaze of the user by using image data of the both eyes of the user taken by the imaging section; making a first judgment, by using the point of gaze, whether the user gazes at a certain area on the virtual screen or the user gazes on a background beyond the virtual screen; and making a second judgment whether a sight-line region overlaps with a display position of the object on the virtual screen or not, where the sight-line region is a region around an intersection of the virtual screen and a line connecting a midpoint of the both eyes and the point of gaze. The display control method further comprises, in response to a movement of the point of gaze, making a change of the object in at least one of a display position and a display mode on a basis of results of the first judgment and the second judgment.

Other features of illustrative embodiments will be described below.

BRIEF DESCRIPTION OF THE DRAWINGS

Embodiments will now be described, by way of example only, with reference to the accompanying drawings which are meant to be exemplary, not limiting, and wherein like elements numbered alike in several figures, in which:

FIG. 5 illustrates an example of a definition of an object property according to the one embodiment of the present invention;

FIG. 6 illustrates an example of an object property table according to the one embodiment of the present invention;

DETAILED DESCRIPTION

Figure 1A:
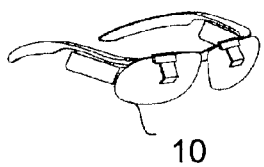
FIGS. 1A, 1B, and 1C each is a schematic diagram illustrating the constitution of an information display system according to one embodiment of the present invention.

Illustrative embodiments of information display systems, non-transitory computer-readable storage media each storing a display control program, and display control methods will be described with reference to the drawings. It will be appreciated by those of ordinary skill in the art that the description given herein with respect to those figures is for exemplary purposes only and is not intended in any way to limit the scope of potential embodiments may be resolved by referring to the appended claims.

In an information display system including a transmission type HMD as one embodiment of the present invention, there is provided a control section to control a transmission type HMD. The control section is configured to conduct the following control (by executing a control program). The control section detects a point of gaze of a user on the basis of data obtained by shooting both eyes of the user. By using the detected point of gaze, the control section makes a judgment whether the user gazes at an area on a virtual screen or the user gazes on the background beyond the virtual screen and further makes a judgment whether the sight line of the user is overlapped with an object displayed on the virtual screen or not. On the basis of results of these judgments, the control section makes a change of the object in the display position and/or the display mode.

Additionally, the control section may be configured to further conduct the following control (by executing the control program). The control section further makes a judgment of the property of the object overlapped with the user's sight line, and make the change of the object in the display position and/or the display mode further on the basis of the result of the judgment.

Accordingly, the information display system (the control program and the display control method) can cause a transmission type HMD to appropriately display information with securing a view field of a user.

As described in the descriptions of the background, in a wearable transmission type HMD, images of information pieces are displayed on a virtual screen such that the information images are superimposed (superimposing display) on the background being an ambient environment, whereby a wearing person (user) can confirm various kinds of information pieces while looking at the background. However, in an information display system using the conventional transmission type HMD, an information image displayed on a virtual screen may obstruct a view field of a user depending on the intended position of a sight line of the user. For example, when a user gazes on the background beyond a virtual screen and an information image on a virtual screen is located on a sight line of the user, a view field of the user is obstructed by the display of this information image, which was a problem.

On the other hand, in an information display system, various kinds of information pieces may be displayed as an information images on a virtual screen, and some information pieces are provided to be displayed while being superimposed on the background, which comes from a feature of the information display system. If the display position of such an information piece is changed, a worth of the information piece may be spoiled. For example, examples of the above information pieces include an information piece produced by a CG (Computer Graphics) synthesizing technique with an intention so as to be displayed on the virtual screen while being superimposed virtually at a specific position on the background (on a real space). For such an information piece, it may be not preferable on some situations to change the display position of an image of the information piece simply with the reason that the information image obstructs a view field of a user.

In other words, in accordance with where a user gazes and what kind of information piece the displayed information piece is, it is necessary to judge how to change a display mode of the information image displayed on a virtual screen. However, the conventional information display system shifts an information image uniformly without performing such judgment, or even if judging the kind of the information piece, the conventional information display system merely shifts it to a fixed display position. Accordingly, there was a problem that the conventional information display hardly display an information image appropriately while securing a view field of a user.

In view of that, one embodiment of the present invention provides a control section configured to conduct the following control. The control section detects a point of gaze of a user (a point at where the respective sight lines of both eyes of the user overlap with each other) by using image data obtained by shooting the both eyes of the user. By using the detected point of gaze, the control section judges whether the user gazes at a certain area on a virtual screen or gazes on the background beyond the virtual screen. The control section further judges whether a region in the vicinity of a point where the point of gaze is mapped on the virtual screen (that is, an intersecting point between a flat face of the virtual screen and a line connecting the midpoint of the both eyes and the point of gaze), overlaps with a display region of an information piece (hereafter, referred to an object), such as characters, a figure, and an image. That is, in this judgment, the control section judges whether an object is displayed in a sight-line region of the user or not. Then, the control section makes a change of an object in a display position and/or a display mode of the object on the basis of the both judgment results. For example, when the control section has judged that the user gazes on the background beyond the virtual screen and has judged that the above sight-line region is overlapped with the display position of the object, the control section changes the display position of the object to the outside of the sight-line region or increases the transmittance of the object (display the object to be faint) on the virtual screen. Here, a sight-line region is a certain region on the virtual screen and has a reference position defined by mapping the point of gaze of the user on the virtual screen. The detail of the sight-line region will be described later.

Optionally, the control section is configured to judge the property of the object which overlaps with the sight-line region, and to change the display position and/or the display mode of the object in accordance with the judgment result. For example, when the control section has judged that the object has a property indicating that the object is expected to be displayed on the virtual screen independently from and regardless of the background, the control section changes the display position of the object to the outside of the sight-line region or increases the transmittance of the object (display an object to be faint) on the virtual screen. On the other hand, when the control section has judged that the object has a property indicating that the object is expected to be displayed while being superimposed on the background, the control section increases the transmittance of the object (display an object to be faint) on the virtual screen.

Further, the display control section is preferably configured to restore the display position and/or display mode of the object to the original state, on obtaining a judgment result that the user gazes at a certain area on the virtual screen or a judgment result that the sight-line region is overlapped with the display position of the object as a result of a movement of the point of gaze of the user after the display control section has changed the display position and/or display mode of the object.

In this way, by conducting the display control in consideration of a user's intention and the information value of an object, it becomes possible to operate the HMD to display an object appropriately while keeping the object on the virtual screen from becoming an obstacle for a view field of a user. Additionally, at the time of changing the display position and/or display mode of an object or returning the object into the original state, the control section is preferably configured to change the display position and/or display mode gradually. It becomes possible not to attract a user's attention carelessly.

EXAMPLES

Figure 1B:
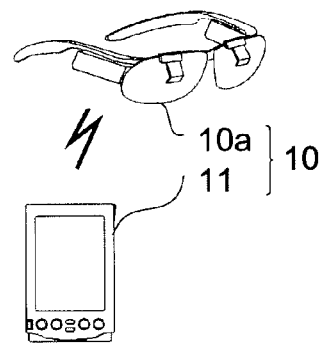
Figure 1C:
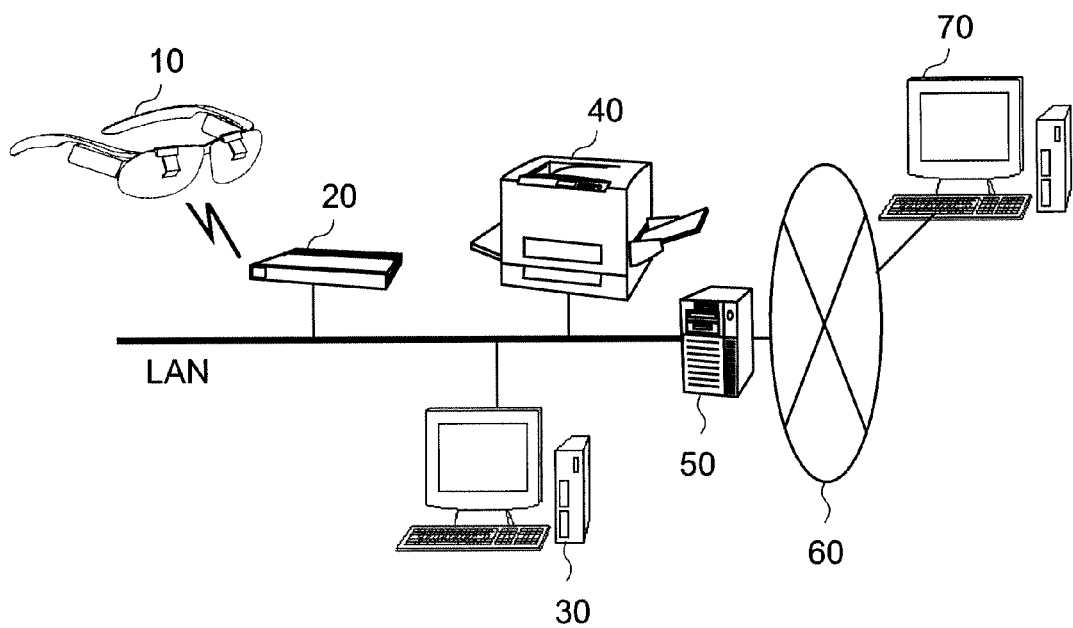

In order to describe the above-mentioned embodiment of the present invention in more detail, description will be given to an illustrative information display system having a transmission type HMD, an illustrative display control program, and illustrative display control method with reference to FIGS. 1 to 19. FIGS. 1A, 1B, and 1C each is a schematic diagram illustrating the constitution of an information display system of the present example, and FIGS. 2A and 2B each is a block diagram illustrating the constitution of the information display system. Further, FIGS. 3A and 3B and FIGS. 4A and 4B each a diagram for illustrating a point of gaze of a user, FIG. 5 illustrates an example of a definition of an object property, and FIG. 6 illustrates an example of an object property table. Furthermore, FIGS. 7 to 10 and FIGS. 17 to 19 each is a flowchart illustrating operations of a transmission type HMD of the present example, and FIGS. 11A to 16B are schematic diagrams illustrating modified examples of the display position and/or display mode of an object.

The information display system of the present example is a system including a transmission type HMD 10, and may be considered to have various constitutions. A typical constitution is a constitution in which the transmission type HMD 10 works independently as illustrated in FIG. 1A, or a constitution in which the transmission type HMD 10 is separated into a main body 10a of the transmission type HMD 10 and a control section 11, which are connected to each other via a cable or wireless as illustrated in FIG. 1B. Further, in the case where objects to be displayed on a virtual screen of the transmission type HMD 10 are created, edited, and/or utilized via other devices, as illustrated in FIG. 1C, the information display system may have a constitution that the transmission type HMD 10, a communication terminal 20, a computing device 30 configured to create and edit objects, and an image forming apparatus 40 configured to print and transmit via facsimile objects, which are connected to each other via a network. Furthermore, it may be constituted that a server 50 is disposed on the network and the above apparatuses including the transmission type HMD 10 may be connected to a computing device 70 on the external network via the Internet 60.

Here, the kind of the network is optional, and in the constitution illustrated in FIG. 1C, the communication terminal 20, the computing device 30, the image forming apparatus 40, and the server 50 are connected to each other via LAN (Local Area Network) defined by specifications, such as Ethernet (registered trademark), FDDI (Fiber-Distributed Data Interface), and Token Ring. Further, the network at the transmission type HMD 10 side and an external network can be connected to each other by using the Internet line or a public facsimile line. Further, the transmission type HDM 10 may be connected to the network via mobile communication lines, such as LTE (Long Term Evolution)/3G or wireless communication lines, such as WiMAX. Furthermore, in the communication between the main body 10a of the transmission type HMD 10 and the control section 11 in the constitution illustrated in FIG. 1B, or in the communication between the transmission type HDM 10 and the communication terminal 20 in the constitution illustrated in FIG. 1C, a short distance wireless communication defined by specifications, such as Bluetooth (registered trademark), NFC (Near Field Communication), TransferJet, Wibree, and IrDA may also be used.

Hereafter, description will be given in detail to a transmission type HMD 10 serving as one important component of an information display system of the present example. In the present example, the description is made on the basis of the constitution illustrated in FIG. 1A.

Figure 2A:
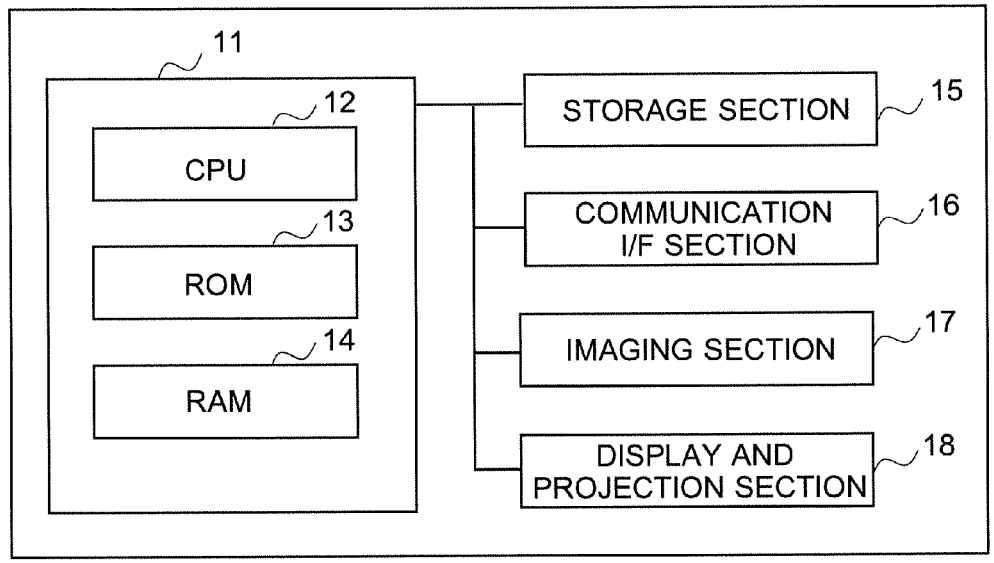
FIGS. 2A and 2B each is a block diagram illustrating the constitution of an information display system according to one embodiment of the present invention.

The information display system of the present example is integrated into a single body together with a member (for example, glasses, sunglasses, goggles, a hat, etc.) which a user wears, and, as illustrated in FIG. 2A, includes a control section 11, a storage section 15, a communication I/F (interface) section 16, an imaging section 17, a display and projection section 18, etc.

Figure 2B:
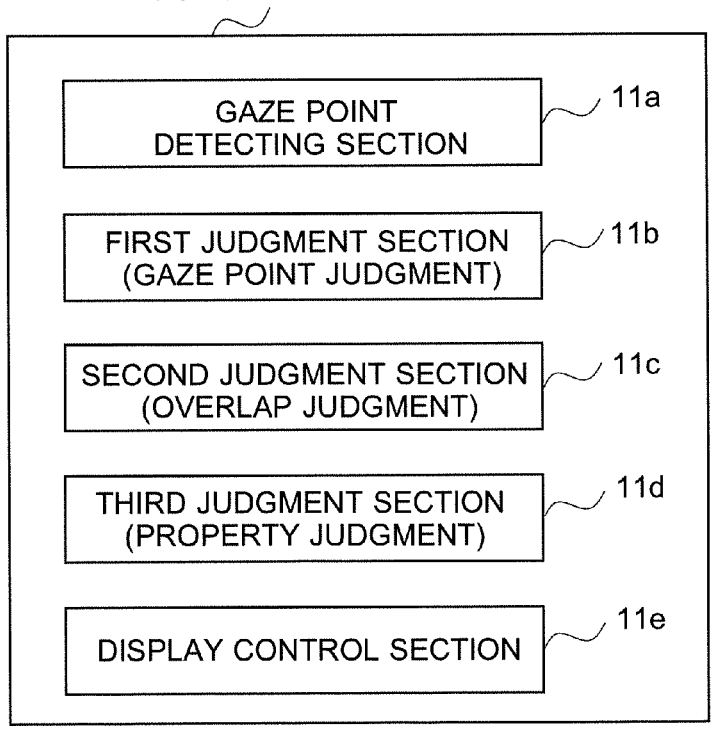

The control section 11 includes a CPU (Central Processing Unit) 12 and a memory, such as a ROM (Read Only Memory) 13 and a RAM (Random Access Memory) 14, and is fixed or arranged at an inside or outside of a case (such as a temple of each item of glasses, sunglasses, goggles, etc.) of the transmission type HMD 10. The CPU 12 is adapted to read out programs such as a control program to control operations of the transmission type HMD 10 from the ROM 13 or the storage section 15, to develop them into the RAM 14, and to execute them. The control section is configured, as illustrated in FIG. 2B, to function also as a gaze point detecting section 11a, a first judgment section 11b, a second judgment section 11c, a third judgment section 11d, a display control section 11e, and the like.

The gaze point detecting section 11a is configured to, on the basis of data of an image of the both eyes of a wearing person (user) taken by a below-mentioned imaging section 17, detect a point of gaze of the user (a point at which the respective sight lines of both eyes of the user intersect with each other) by using a below-mentioned known method and send the position (coordinates) of the detected point of gaze to the first judgment section 11b, the second judgment section 11c, and the display control section 11e.

The first judgment section 11b is a section to judge a point of gaze of a user and is configured to conduct the following operations. That is, by using the position (coordinates) of the point of gaze notified from the gaze point detecting section 11a and the configuration information (a distance between both eyes of the user and a virtual screen) of the transmission type HMD 10, the first judgment section 11b judges whether the user gazes at a certain area on a display and projection section 18 (virtual screen) or gases on the background beyond the virtual screen. Then, the first judgment section 11b sends a judgment result to the display control section 11e.

The second judgment section 11c is a section to judge an overlap between a sight line of a user and an object, and is configured to conduct the following operations. That is, based on the position (coordinates) of the point of gaze sent from the gaze point detecting section 11a and the configuration (the position of each of both eyes of the user) of the transmission type HMD 10, the second judgment section 11*c* determines a position at which the point of gaze of the user is mapped on the virtual screen (in other words, an intersection of the virtual screen and a line connecting the midpoint of both eyes of the user and the point of gaze), and judges whether a certain range (hereafter, called as a sight-line region) defined on the basis of the mapped position overlaps with the display position of an object displayed on the virtual screen. Then, the second judgment section 11*c* sends a judgment result to the display control section 11*e*.

The third judgment section 11*d* is configured to obtain a property associated with the object overlapping with the sight-line region by using an object property table memorized beforehand in the storage section 15, and to judge, by using the obtained property, whether the object is an object to be displayed on the virtual screen independently without regard to the background, or an object to be displayed on the virtual screen while being superimposed on the background. Then, the third judgment section 11*c* sends a judgment result to the display control section 11*e*.

The display control section 11*e* is configured to conduct the following control. The display control section 11*e* reads out data of an object from the storage section 15, and to operate the display and projection section 18 to display the object. Further, in the case where the gaze point detecting section 11*a* has detected a movement of the point of gaze of the user, the display control section 11*e* changes or restores at least one of the display position and display mode of the object on the basis of the respective judgment results of the first judgment section 11*b*, the second judgment section 11*c*, and, if needed, the third judgment section 11*d*. For example, in the case where it has been judged that a user gazes on the background beyond the virtual screen and the sight-line region and the display position of the object overlap with each other (and that the object is an object to be displayed regardless of the background, if needed), the display control section 11*e* changes at least one of the display position and display mode of the object. Further, under the condition that the gaze point detecting section 11*a* has detected a movement of the point of gaze of the user after at least one of the display position and the display mode of an object have been changed, the display control section 11*e* restores the display position and/or display mode of the object to the original state when the movement of the point of gaze of the user results in the situation that the user gazes at a certain area on the virtual screen or that the sight-line region and the display position of the object do not overlap with each other.

In the present example, changing the display position of an object means shifting the object to the outside of the sight-line region. Further, changing the display mode of an object means lowering of the visibility of the object, such as, lessening of the display luminance or the amount of projecting light for the object (in this example, described as increasing the transmittance of an object), reducing of the size of the object (including both reducing in the similar figure and reducing in a deformed figure), thinning of a line of characters if the object is a text object, displaying in a blinking mode in order to reducing the display period in time of the object, and displaying the object partially (including, displaying the object in a mesh mode or a dot mode). Furthermore, in the present example, restoring the display position of an object means returning the object to the original display position (a position at which the display position overlaps with a sight-line region). Similarly, restoring the display mode of an object includes returning the transmittance and size of an object and the thickness of a line of a component of the object to the respective original states, displaying the object always, and displaying the whole of the object.

Here, the gaze point detecting section 11*a*, the first judgment section 11*b*, the second judgment section 11*c*, the third judgment section 11*d*, and the display control section 11*e* may be constituted as hardware. Alternatively, the control section 11 may be provided to function as the gaze point detecting section 11*a*, the first judgment section 11*b*, the second judgment section 11*c*, the third judgment section 11*d*, and the display control section 11*e*, when the CPU 12 executes a display control program. In the case of the constitution illustrated in FIG. 1C, the display control program may be provided to be executed in an arbitrary device such as the computing devices 30 and 70, and the server 50.

The storage section 15 is a storage such as a flash memory, HDD (Hard Disk Drive), SSD (Solid State Drive), and a SD (Secure Digital) card, and is fixed or arranged at an inside or outside of a case (such as a temple of each item of glasses, sunglasses, goggles, etc.) of the transmission type HMD 10. The storage section 15 is configured to memorize the data of an object to be displayed on the display and projection section 18, setup information for determining the position of each of both eyes and the position of a virtual screen, flags which indicate existence or non-existence of change in the property and display mode of an object for each object, an object property table in which each object is associated with its display position coordinates, and the like.

The communication I/F (interface) sections 16 may be a NIC (Network Interface Card), a modem, or the like, is fixed or arranged at an inside or outside of a case (such as a temple of each item of glasses, sunglasses, goggles, etc.) of the transmission type HMD 10, and is configured to make a communication with external devices via wireless LAN communication, mobile communications, short distance radio communication, and the like. In the case where the transmission type HMD 10 does not need to communicate with an external device (for example, in the case where an SD card is used to exchange data with an external device), the communication I/F section 16 may be omitted. Further, in the case where the transmission type HMD 10 is divided into a main body 10*a* and a control section 11, both of them may be equipped with the communication I/F section 16, and the control section 11 controls the transmission type HMD body 10*a* via the communication I/F sections 16 of them.

The imaging section 17 may be an imaging device such as a CCD (Charge Coupled Devices) camera, a CMOS (Complementary Metal Oxide Semiconductor) camera, or the like, and is fixed to a case (such as an armor, an end piece and a bridge of each item of glasses, sunglasses, goggles, etc.) of a transmission type HMD 10. The imaging section 17 is configured to take an image or images of the position or movement of pupils of both eyes of a wearing person (user) directly or by using a half mirror and to send the image data to the control section 11.

The display and projection section 18 is a display device or a projecting device to form an image of an object on a virtual screen while superimposing the object on the background, by using the data of the object received from the control section 11. Examples of the way to form an image of an object on the virtual screen include a displaying method in which the display and projection section 18 is a display unit exhibiting transparency and displays an object thereon; and a projecting method in which the display and projection section 18 projects an image of information as an object on a member having transparency. In the case of the displaying method, a display unit such as a transmission type liquid crystal display is arranged on a surface of a lens or a glass of glasses, sunglasses, or goggles, and the liquid crystal display is driven by a driving circuit fixed or arranged on the case of the transmission type HMD 10 so as to display an object, whereby an image of the object is formed on the virtual screen. In the case of the projecting method, a projecting device is arranged on a part, such as an armor and an end piece, of glasses, sunglasses or goggles, and the projecting device projects an image of an object on a lens or a glass, whereby an image of the object is formed on the virtual screen.

FIGS. 2A and 2B illustrate an example of the information display system (the transmission type HMD 10) of the present example, and its constitution can be modified appropriately as long as the transmission type HMD 10 can display an object on a virtual screen while superimposing the object on the background viewed beyond the virtual screen, and at least one of the display position and display mode of the object can be changed and/or restored in accordance with the position of the point of gaze of a user and an overlap of a sight line of the user and the display region of the object. For example, the information display system may be configured to change and/or restore at least one of the display position and display mode of the object in accordance with a property of the object in addition to the position of the point of gaze of the user and the overlap of the sight line of the user and the display region of the object.

Figure 3A:
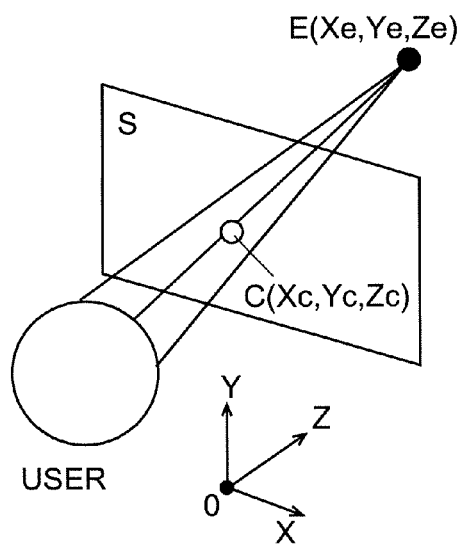
FIGS. 3A and 3B each is a diagram for illustrating a setup condition of a transmission type HMD according to the one embodiment of the present invention.
Figure 3B:
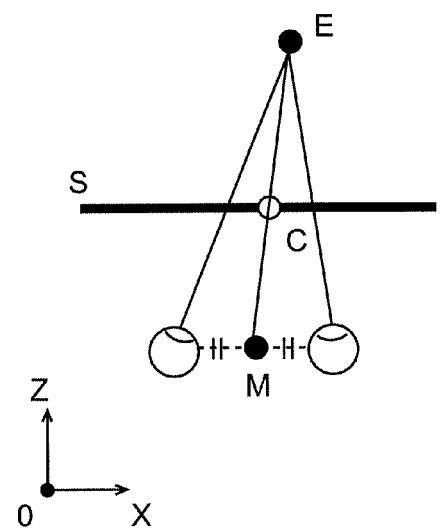
Figure 4A:
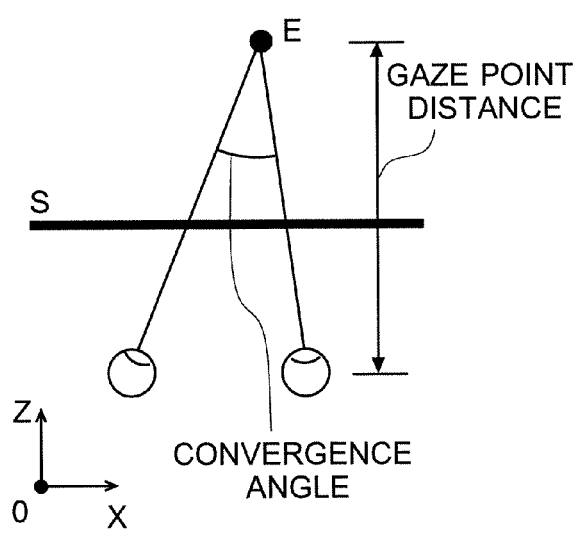
FIGS. 4A and 4B each is a diagram for illustrating a point of gaze in the transmission type HMD according to the one embodiment of the present invention.
Figure 4B:
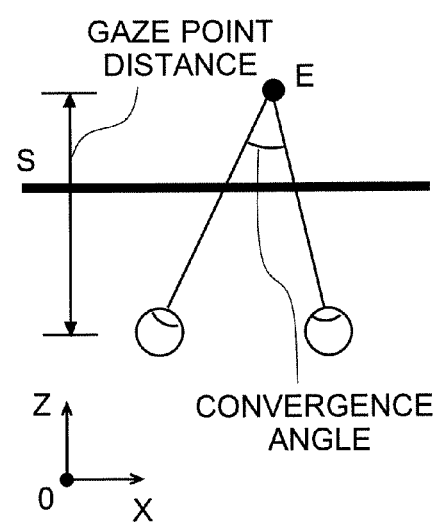

Hereafter, description is given to a method of detecting a point of gaze of a user by using the transmission type HMD 10 of the present example with reference to FIGS. 3A, 3B, 4A and 4B. FIG. 3A is a perspective view, and FIG. 3B is a plan view, which illustrate schematically a positional relationship between a point of gaze of a user and a virtual screen. Further, FIGS. 4A and 4B each is a diagram illustrating schematically a relationship between a gaze point distance and a convergence angle. FIG. 4A illustrates a case where a point of gaze of a user is located at a distant point, and FIG. 4B illustrates a case where a point of gaze of a user is located at a close point.

The reference coordinate system (X, Y, Z) of an information display system is established as illustrated in FIGS. 3A and 3B. Here, it is supposed that a virtual screen is arranged on an XY flat plane and the gaze direction of a user is the Z direction. In FIGS. 3A and 3B, S represents a flat face of the virtual screen on which an image of an object is formed by the display and projection section 18, E represents a point of gaze of a user, and C represents an intersection between the flat face of the virtual screen S and a line segment connecting a middle point M of both eyes of the user and the point of gaze E of the user. Here, it is supposed that both eyes of a user are arranged in parallel to the flat face of the virtual screen S, and that the distance of the both eyes, the position of the middle point M, and the distance from the both eyes to the flat face of the virtual screen S have been set up beforehand.

In such an information display system, the three-dimensional positions (coordinates) of the point of gaze can be detected by using a well-known technique. For example, as illustrated in FIGS. 4A and 4B, the sight-line direction of each of both eyes can be determined based on the position of the pupil of each of both eyes, a convergence angle can be acquired from a difference between the respective sight-line directions, and the coordinates of the point of gaze can be obtained from a distance between the both eyes and the convergence angle. One detecting method of a point of gaze is disclosed in, for example, "Evaluation of Binocular Eye Tracker and Algorithms for 3D Gaze Interaction in Virtual Reality Environments" by Thies Pfeiffer, Marc E. Latoschik, Ipke Wachsmuth in Journal of Virtual Reality and Broadcasting, Volume 5, No. 16, 2008.

Therefore, the control section 11 (gaze point detecting section 11a) is configured to acquire image data prepared by taking an image of the eyeballs of both eyes with the imaging section 15, to analyze the acquired image data, and to determine the convergence angle on the basis of the respective positions of pupils, whereby the coordinates of the point of gaze E of a user can be obtained from the distance between both eyes of the user. Successively, the control section 11 (the first judgment section 11b) can judge, by using the coordinates of this point of gaze E, whether the user gazes at an area on the virtual screen or on the background beyond (located farther than) the virtual screen. Further, the control section 11 (the second judgment section 11c) can calculate the coordinates of C on the virtual screen by using the coordinates of the point of gaze E and the coordinates of the middle point M of both eyes, and can judge whether the object is displayed on a sight-line region, by comparing the coordinates of C with the coordinates of the object displayed on the virtual screen.

Next, a property of an object to be displayed on the virtual screen is described. FIG. 5 shows an example of the definition of an object property. As shown in FIG. 5, examples of the object to be displayed on the virtual screen includes pieces of information (for example, a recognition result of a substances or a building existing in the background) intended to be displayed while being superimposed on the background (displayed in consideration of the background) and pieces of information (for example, a document, a photograph, a moving image, etc.) to be displayed independently regardless of the background. In the case where a user gazes at an area on the background and these objects overlap with a sight line of the user, the former type of objects are preferably displayed without being moved and with the transmittance increased so that the user can view the background easily because they have a correlation with the background, and the latter type of objects are preferably displayed with being moved so as not to overlap with the sight line of the user and/or with the transmittance increased so that the user can view the background easily because they have no correlation with the background.

Then, in the present example, when displaying objects on the display and projection section 18, the control section 11 (display control section 11e) judges for each of the objects that the concerned object is which kind of the above information piece, on the basis of the kind of the application which has created or acquired the object and the extension of the object data. Successively, the control section 11 adds a description of each object and its property into an object property table shown in FIG. 6 with correlating each of objects with its property, and stores the table in the storage section 15. Subsequently, the control section 11 (the third judgment section 11d) is configured to judge the property of an object displayed on a region in the vicinity of the point of gaze with reference to the object property table shown in FIG. 6. As a result of the judgment, when the property of the object is "1", the control section 11 (display control section 11e) changes the display mode of the object, and when the property of the object is "2", the control section 11 changes the display position and/or display mode of the object.

Further, in the case where the control section 11 (display control section 11e) has changed the display position and/or display mode of the object, the control section 11 writes "true" in a display change flag in the property table, and in addition, in the case where a change is caused on the display position of the object, the control section 11 writes also the original display position coordinates (X, Y) on the virtual screen into the object property table.

In this way, by defining a property of each object in accordance with its characteristic and describing the property into the object property table, the control section 11 can make a change of an object, when the object is displayed on the sight-line region, in the display position and/or display mode appropriately. Further, by describing the display change flag and the original display position coordinates in the object property table, the control section 11 can restore the object having been changed in terms of the display position and/or display mode, when the object is displayed on the sight-line region, to the original state appropriately in response to a shift of the point of gaze of the user.

Hereafter, operations of the transmission type HMD 10 with the above-mentioned constitutions is described. The CPU 12 performs processes in steps of a flowchart illustrated in each of FIGS. 7 to 10 and 17 to 19 by reading the display control program memorized to the ROM 13 or the storage section 15, developing the program into the RAM 14, and executing the program. In the following flow, the property of each of objects displayed on the display and projection section 18 has been registered beforehand in the object property table.

Figure 7:
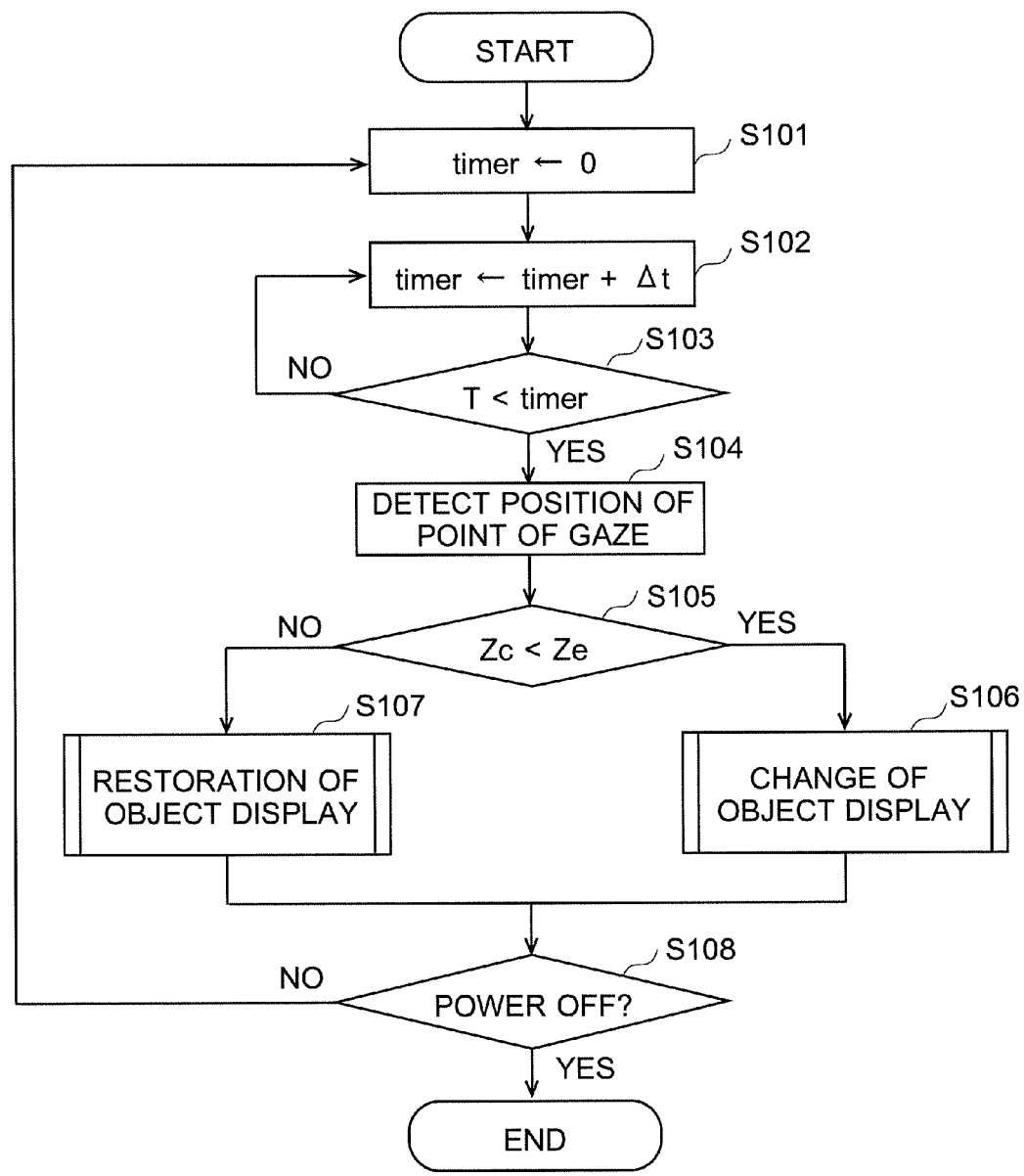
FIG. 7 is a flowchart illustrating operations of the transmission type HMD according to the one embodiment of the present invention.

As illustrated in FIG. 7, the control section 11 sets a timer to 0, and repeatedly increases the timer by a prescribed time ("Δt") until the measuring time of the timer exceeds a predetermined time "T" (S101 to S103). When the measuring time of the timer has exceeded the predetermined time "T", the control section 11 (gaze point detecting section 11a) detects the position of a point of gaze of a user, by using the image data sent from the imaging section 17 (S104). This detection process of the position of the point of gaze is as having mentioned above, the control section 11 analyzes image data prepared by taking an image of the eyeballs of both eyes of the user with the imaging section 15, determines a convergence angle by using the respective positions of pupils, and detects the coordinates of a point of gaze E of the user from the distance between both eyes of the user.

Next, the control section 11 (the first detecting element 11b) judges whether the detected position ("Ze") of the point of gaze of the user is larger than the point ("Zc") on the virtual screen (that is, whether the user gazes on the background beyond the virtual screen or not). When Zc<Ze (when the user gazes on at the background beyond the virtual screen), the control section 11 (display control section 11e) executes processing of a change of the object in the display position and/or display mode (S106). On the other hand, when Zc≥Ze (when the user gazes at an object on the virtual screen), the control section 11 (display control section 11e) executes processing of a restoration of the display position and/or display mode of the object (S107). The detail of each of the change processing and the restoration processing of the display position and/or display mode is mentioned later.

Then, if the power source of the transmission type HMD 10 is not OFF (No at S108), the control section 11 returns to S101 and repeats the same processes.

Figure 8:
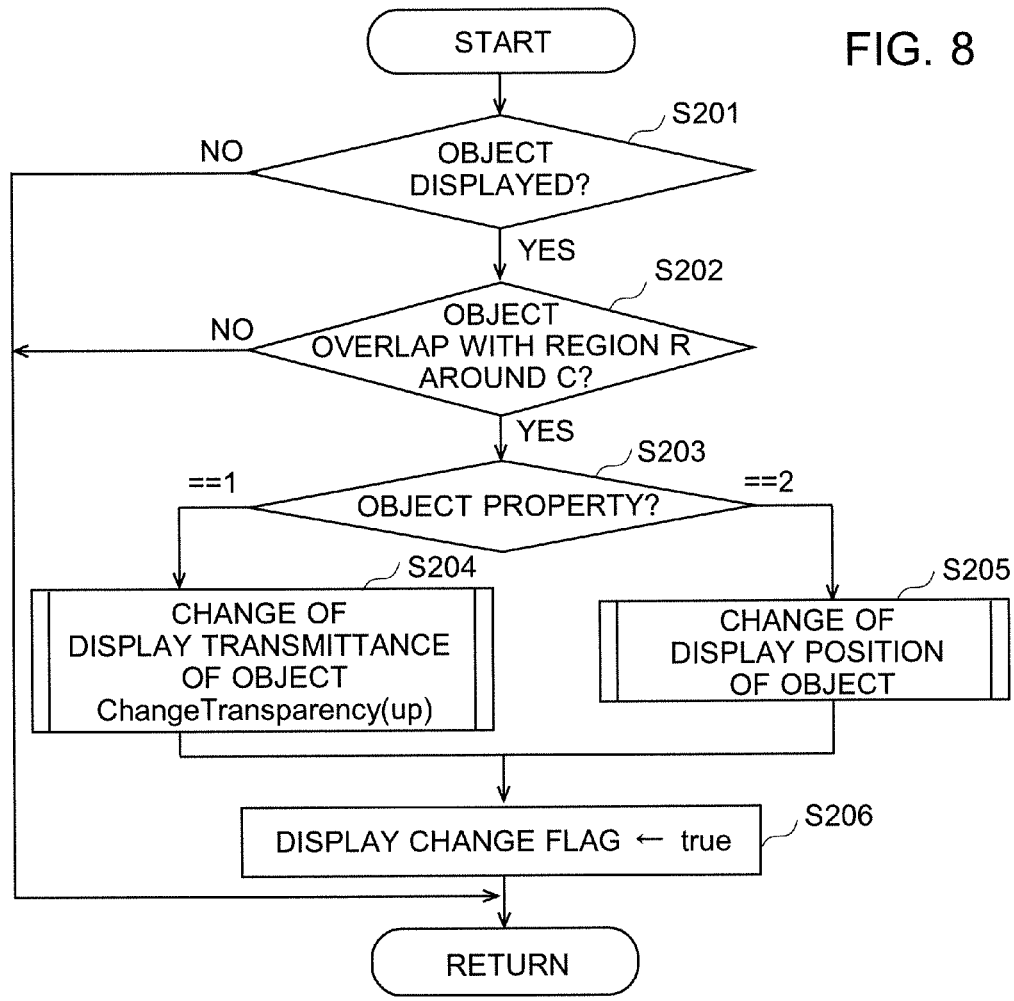
FIG. 8 is a flowchart illustrating operations (change processing of object display) of the transmission type HMD according to the one embodiment of the present invention.
Figure 9:
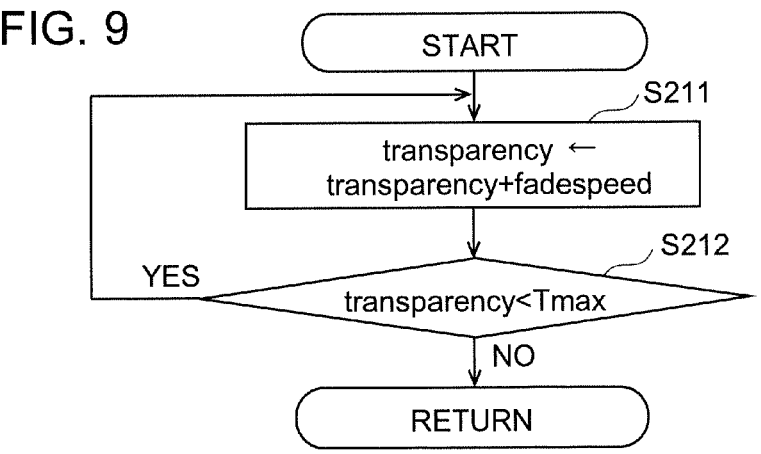
FIG. 9 is a flowchart illustrating operations (change processing of the display transmittance of an object) of the transmission type HMD according to the one embodiment of the present invention.

Next, description is given to the processing of a change of an object in the display position and/or display mode. As illustrated in FIG. 8, the control section 11 judges whether an object is displayed on the display and projection section 18 (S201). When an object is not displayed, since it is not necessary to change the display position and/or display mode, the processes are ended.

When an object is displayed, the control section 11 (the second judgment section 11c) judges whether the display position of the object overlaps with a region R with a radius r around a center formed at a point C on the virtual screen, where the point C corresponds to a position of a sight line of the user on the virtual screen (S202). When the display position of the object does not overlap with the region R, since it is not necessary to change the display position and/or display mode of the object, the processes are ended.

When the display position of the object overlaps with the region R, the control section 11 (the third judgment section 11d) refers to the preliminarily-memorized object property table, and judges whether the property of the object is "1" which indicates that the object is intended to be displayed while being superimposed on the background or "2" which indicates that the object is to be displayed regardless of the background (S203).

When the property of an object is "1", in order to make a background viewable for a user easily while displaying the object in a state of being superimposed on the background, the control section 11 (display control section 11e) executes processing of a change of the transmittance of the object (increasing the transmittance so as to make the degree of the transparency of the object high) (S204). At this time, the transmittance of the object may be changed instantly to a target transmittance. However, if the transmittance is changed instantly, there is a fear to attract a user's attention. Then, in the present example, as illustrated in the flowchart in FIG. 9, the control section 11 increases the transmittance of the object gradually. In concrete terms, the control section 11 (display control section 11e) repeatedly adds a predetermined value ("fadespeed" in FIG. 9, for example, 5%) to the transmittance ("transparency" in FIG. 9) of the object so as to gradually increase the value until the transmittance ("transparency" in FIG. 9) of the object becomes a predetermined transmittance ("Tmax" in FIG. 9, for example, 80%) or more (S211, S212).

Here, the value of each of the above-mentioned "Tmax" and "fadespeed" may be appropriately set in accordance with the size of the object, the change speed of a point of gaze, and the like. For example, in the case where the size of the object is large, since it may be considered to tend to attract a user's attention, the value of "Tmax" may be made large and the value of "fadespeed" may be made small (the transmittance is changed slowly so as to make the object transparent). Further, in the case where the change speed of a point of gaze is large (a user has changed the point of gaze onto the background suddenly), since it is considered that the possibility that an object becomes an obstacle for a visual field of the user is high, the value of each of "Tmax" and "fadespeed" may be made large (transmittance is changed quickly so as to make the object transparent).

On the other hand, in the case where the property of an object is "2", in order to make the object not to become an obstacle for a visual field of the user, the control section 11 (display control section 11e) executes processing of a change of the display position of the object (S205). At this time, the display position of the object may be changed instantly to a target display position. However, if the display position of the object is changed instantly, there is a fear to attract a user's attention. Further, the position may be changed while keeping the transmittance of the object as it is. However, if the object is shifted in the state that the transmittance of the object is low, there is a fear to attract a user's attention. Then, in the present example, the display position is changed while the transmittance of the object is gradually increased in accordance with the flowchart illustrated in FIG. 10.

Figure 10:
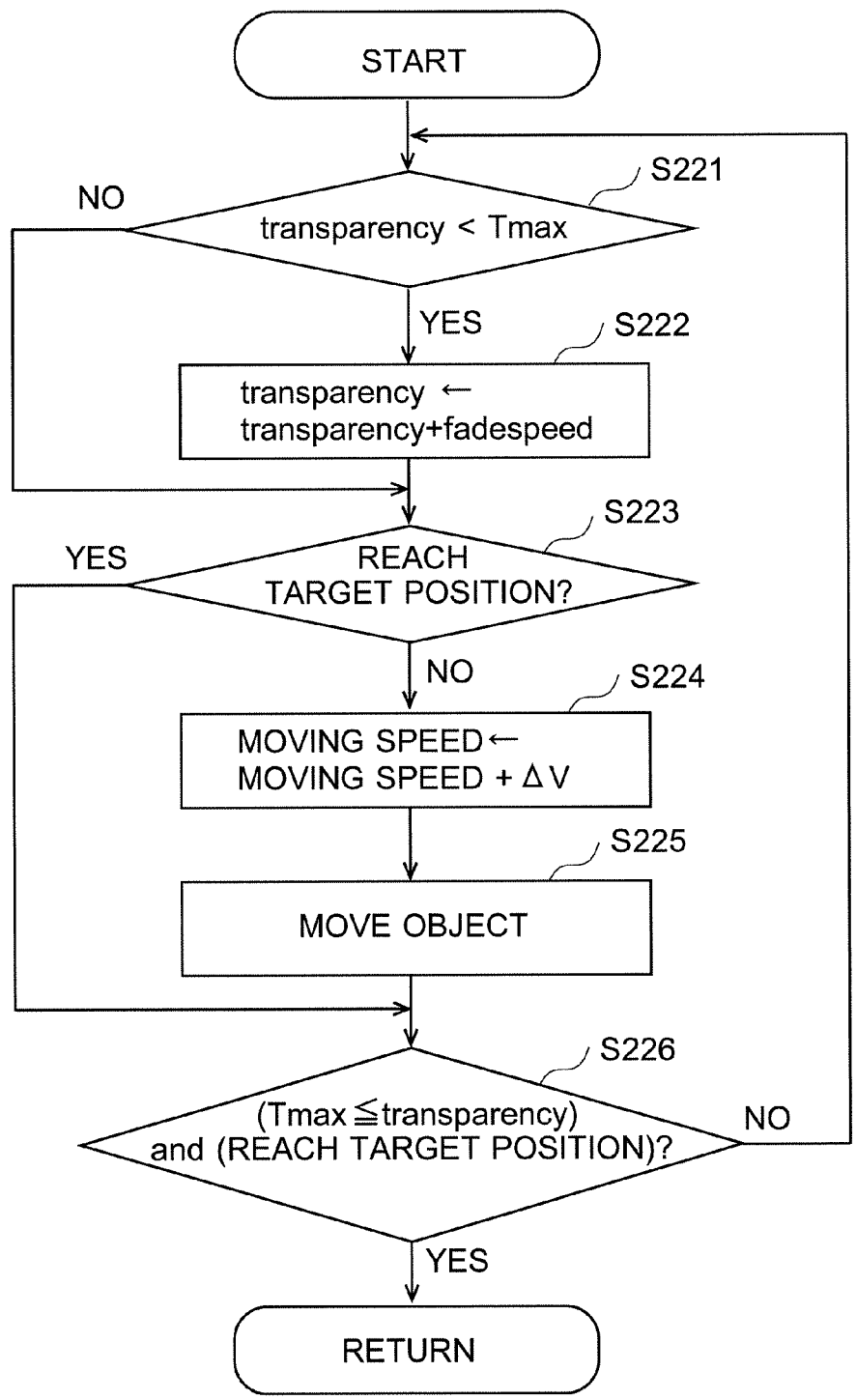
FIG. 10 is a flowchart illustrating operations (change processing of the display position of an object) of the transmission type HMD according to the one embodiment of the present invention.

In concrete terms, as illustrated in FIG. 10, the control section 11 (display control section 11e) judges whether the transmittance ("transparency") of the object is smaller than a predetermined transmittance ("Tmax") (S221). Then, when the transmittance is smaller than the predetermined transmittance ("Tmax"), the control section 11 adds a prescribed value ("fadespeed") to the transmittance ("transparency") of the object (S222). Next, the control section 11 (display control section 11e) judges whether the object has reached a target position (a position where the object does not overlap with a sight-line region) (S223). Then, when the object has not reached at the target position, the control section 11 adds a predetermined value ("ΔV") to "moving speed" of the object (S224), and the object is moved at the "moving speed" to which "ΔV" has been added (S225). Successively, the control section 11 (display control section 11e) judges whether the transmittance ("transparency") of the object is a predetermined transmittance ("Tmax") or more and whether the object has reached the target position (S226). Then, when the transmittance ("transparency") of the object is less than the predetermined transmittance ("Tmax"), or when the object has not reached the target position, the control section 11 returns to S221, and repeats the same processes.

Here, in FIG. 10, the position of the object is moved while the transmittance thereof is increased. However, it may be permissible to perform only either one of processing of increasing the transmittance of the object and processing of moving the position of the object. Further, the value of each of the above-mentioned "Tmax", "fadespeed", and "ΔV" may be set up appropriately in accordance with the size of an object, the change speed of a point of gaze, and the like. For example, in the case where the size of the object is large, since it may be considered to tend to attract a user's attention, the value of "Tmax" may be made large (larger than "Tmax" illustrated in FIG. 9), and the value of each of "fadespeed" and "ΔV" may be made small (the transmittance is changed slowly so as to make the object transparent, and the object is moved slowly). Further, in the case where the change speed of a point of gaze is large (a user has changed the point of gaze onto the background suddenly), since the possibility that an object becomes an obstacle for a visual field of the user is considered to be high, the value of each of "Tmax", "fadespeed", and "ΔV" may be made large (the transmittance is changed quickly so as to make the object transparent, and the object is moved quickly).

Returning now to the flowchart illustrated in FIG. 8. The control section 11 (display control section 11e) sets the display change flag in the object property table to "true" (S206). When having moved the object, the control section 11 sets the coordinates of the object before the moving at the original display position coordinates in the object property table, and ends the change processing of the object display. For example, as can be seen from the object property table shown in FIG. 6, since the processing of change of the object display transmittance at S204 has been performed for "OBJECT A", its display change flag has been set to "true". Further, since the processing of change of the object display at S205 has been performed for "OBJECT C", its display change flag has been set to "true", and the coordinates of the original display position has been set to (80, 300).

Figure 11A:
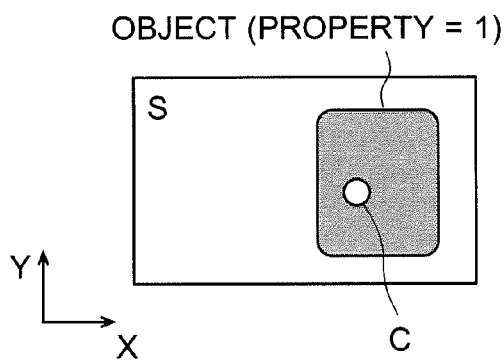
FIGS. 11A and 11B are schematic diagrams illustrating an example of a change of the transmittance of an object displayed on the transmission type HMD according to the one embodiment of the present invention.

FIGS. 11A to 16B illustrate examples in each of which the display position or display mode of an object is changed in accordance with the above-mentioned flow. For example, as illustrated in FIGS. 11A and 11B, in the case where an object with an object property of "1" is displayed on a virtual screen S (FIG. 11A) and a user gazes on the background located farther than the object, the control section 11 (display control section 11e) increases the transmittance (in FIGS. 11A and 11B, a change of the transmittance is represented by the density of the hatching) of a portion of the object which overlaps with a region R with a radius r around a center formed at a point C on the virtual screen corresponding to a sight-line of the user, whereby the object is made not to become an obstacle for a visual field of the user (FIG. 11B).

Figure 11B:
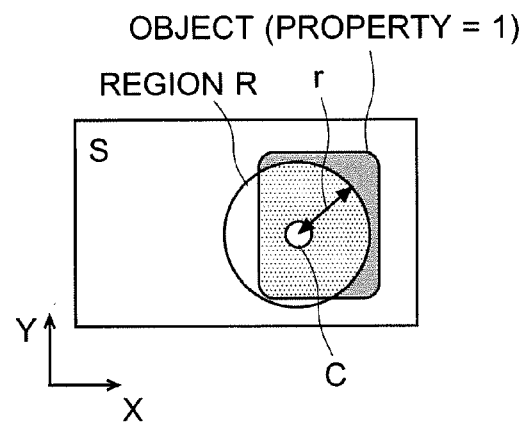
Figure 12A:
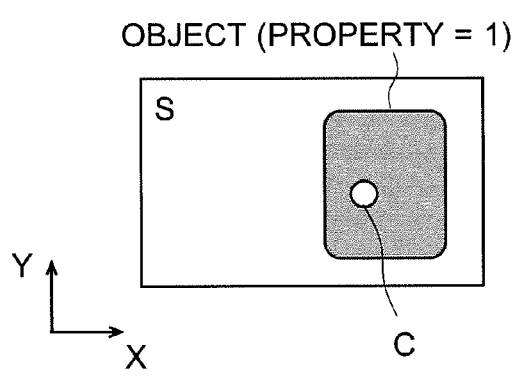
FIGS. 12A and 12B are schematic diagrams illustrating another example of a change of the transmittance of an object displayed on the transmission type HMD according to the one embodiment of the present invention.
Figure 12B:
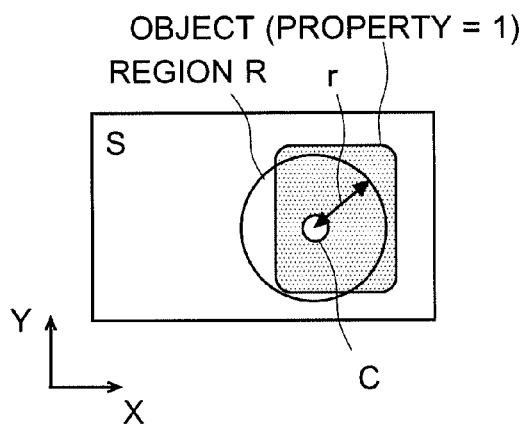
Figure 13A:
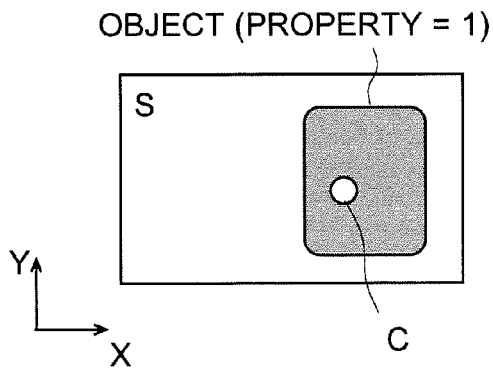
FIGS. 13A and 13B are schematic diagrams illustrating another example of a change of the transmittance of an object displayed on the transmission type HMD according to the one embodiment of the present invention.
Figure 13B:
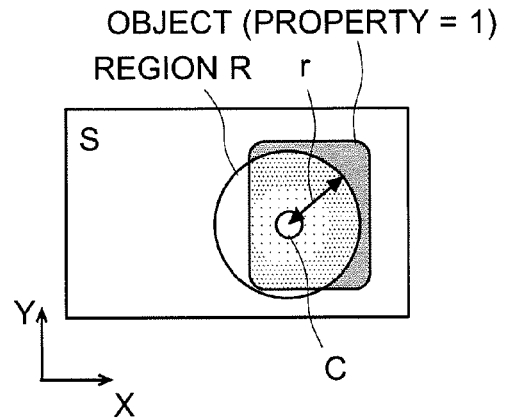

Here, in FIGS. 11A and 11B, only the transmittance of the portion of the object overlapping with the region R is increased. However, for example, as illustrated in FIGS. 12A and 12B, in the case where an object with an object property of "1" is displayed on a virtual screen S (FIG. 12A) and a user gazes on the background located farther than the object, it may be permissible to increase the transmittance of the whole of the object a part of which overlaps with a region R (FIG. 12B). Further, in FIGS. 11A, 11B, 12A, and 12B, the transmittance of the object is increased uniformly. However, for example, as illustrated in FIGS. 13A and 13B, the region R may be divided into multiple regions (in FIG. 13B, two regions) in accordance with a distance from the position C, and then, the transmittances of the divided regions may be set such that a region closer to the position C has an increased transmittance.

Figure 14A:
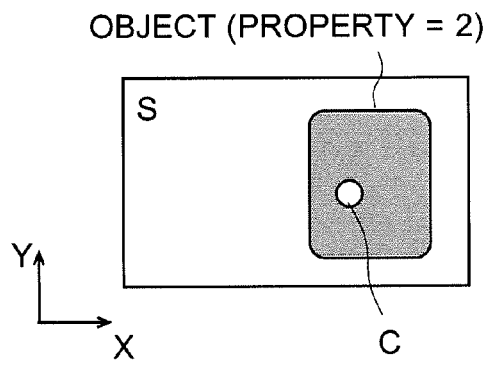
FIGS. 14A and 14B are schematic diagrams illustrating an example of a change of the display position of an object displayed on the transmission type HMD according to the one embodiment of the present invention.
Figure 14B:
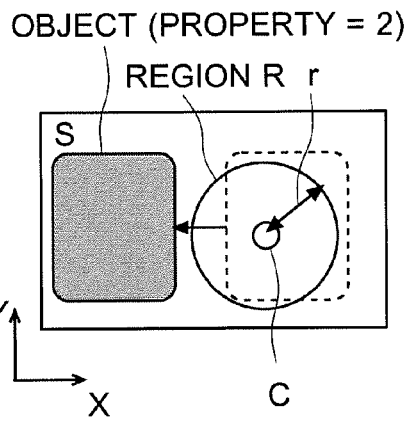

Further, as illustrated in FIGS. 14A and 14B, in the case where an object with an object property of "2" is displayed on a virtual screen S (FIG. 14A) and a user gazes on a background located farther than the object, the control section 11 (display control section 11e) shifts the object to a position where the object does not overlap with a region R with a radius r around a center formed at a point C on the virtual screen corresponding to a sight line of the user, and increases the transmittance of the object if needed, whereby the object is made not to become an obstacle for a visual field of the user.

Figure 15A:
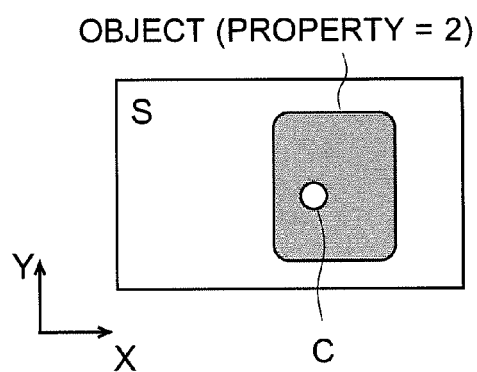
FIGS. 15A and 15B are schematic diagrams illustrating another example of a change of the display position of an object displayed on the transmission type HMD according to the one embodiment of the present invention.
Figure 15B:
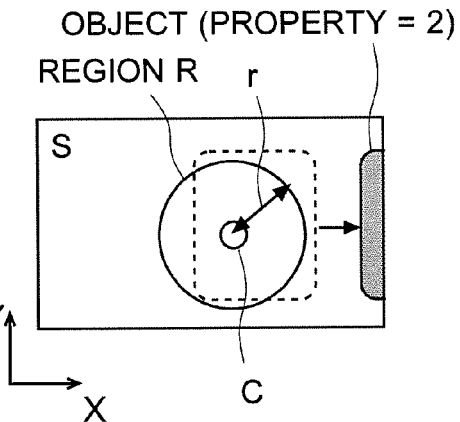
Figure 16A:
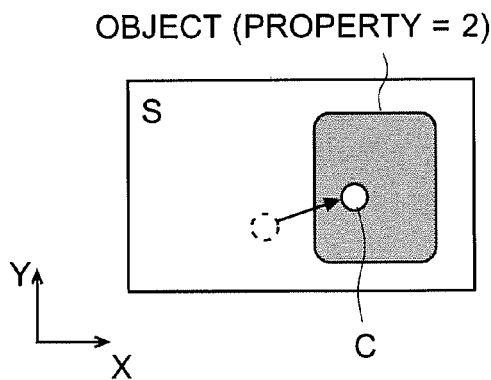
FIGS. 16A and 16B are schematic diagrams illustrating another example of a change of the display position of an object displayed on the transmission type HMD according to the one embodiment of the present invention.
Figure 16B:
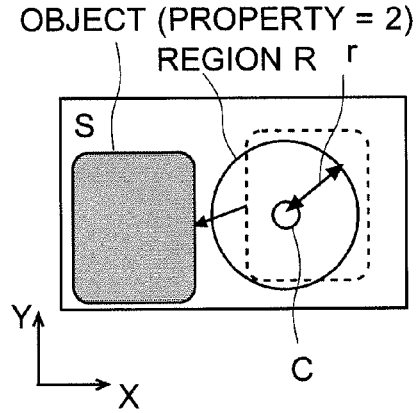

Here, in FIGS. 14A and 14B, the object displayed at the right side on the virtual screen S is shifted to the left side on the virtual screen S. However, the shifting direction of an object is optional. For example, as illustrated in FIGS. 15A and 15B, in the case where an object with an object property of "2" is displayed on a virtual screen S (FIG. 15A) and a user gazes on the background located farther than the object, it may be permissible to shift an object displayed at the right side on the virtual screen S to further the right side on the virtual screen S. In that case, if the object has been shifted so as not to overlap with the region R and it results in that the whole of the object cannot be displayed, only a part of the object may be displayed, and by displaying only a part of the object, it becomes possible to secure a visual field of the user. Further, in consideration of the moving direction of a sight line of the user, the moving direction of an object may be also set up. For example, as illustrated in FIGS. 16A and 16B, in the case where the position of a sight line of the user moves from the center to the right side on the virtual screen S, it is considered that the consciousness of the user concentrates at the right side on the virtual screen S. Accordingly, the object is shifted to the left side on the virtual screen S so that it becomes possible not to attract a user's attention. In that case, it becomes possible to change the moving distance and moving speed of the object in accordance with the moving distance and moving speed of the position of a sight line of the user.

With the above processes, it becomes possible to secure a visual field of a user. However, under the condition that, after the display position and/or the display mode of an object has been changed, a user gazes again at a certain place on the virtual screen due to a change of the point of gaze of the user, leaving the display position or display mode of the object as it is may cause the user difficulty of confirming the object. Therefore, in the present example, at S105 in the flowchart in FIG. 7, in the case where the Z coordinate of the point of gaze E becomes smaller than the Z coordinate of the point C on the virtual screen, restoration processing of the object display is executed. Hereafter, with reference to FIGS. 17 to 19, description is given concretely.

Figure 17:
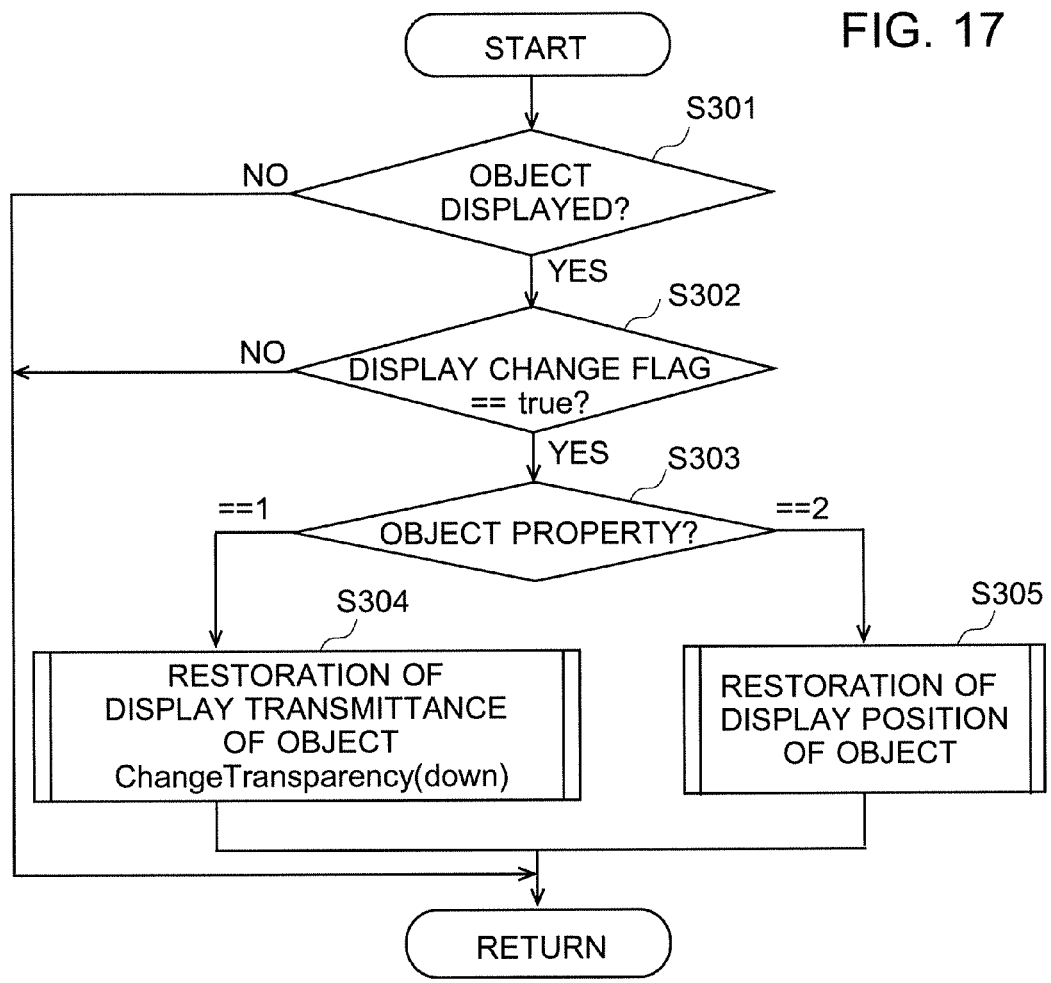
FIG. 17 is a flowchart illustrating operations (restoration processing of the object display) of the transmission type HMD according to the one embodiment of the present invention.
Figure 18:
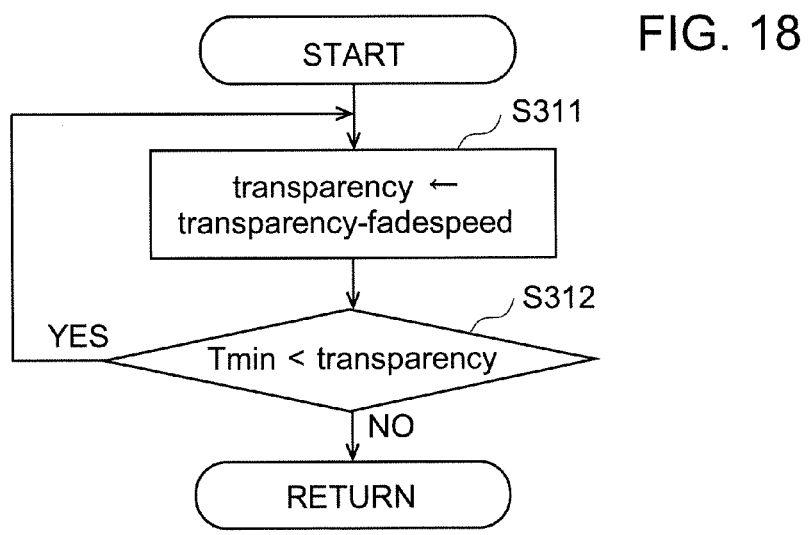
FIG. 18 is a flowchart illustrating operations (restoration processing of the display transmittance of an object) of the transmission type HMD according to the one embodiment of the present invention.

As illustrated in FIG. 17, the control section 11 judges whether an object is displayed on the display and projection section 18 (S301). When an object is not displayed, since it is not necessary to restore the display position and/or display mode of the object, the process is ended.

When an object is displayed on the display and projection section 18, the control section 11 (display control section 11e) judges with reference to the object property table whether the display change flag of the object has been set to "true" (S302). When the display change flag has not been set to "true", since the object is not an object in which the display position and/or the display mode has been changed, the process is ended.

When the display change flag of the object has been set to "true", the control section 11 (the third judgment section 11d) judges with reference to the object property table whether the property of the object is "1" or "2" (S303).

When the property of the object is "1", the control section 11 (display control section 11e) executes restoration processing of the transmittance of the object (the transmittance is decreased and the degree of transparency is made low) (S304). At this time, the transmittance of the object may be changed instantly to the original transmittance. However, if the transmittance is changed instantly, there is a fear to attract a user's attention. Then, in the present example, as illustrated in the flowchart in FIG. 18, the control section 11 decreases the transmittance of the object gradually. In concrete terms, the control section 11 (display control section 11e) repeatedly subtracts a predetermined value ("fadespeed" in FIG. 18, for example, 5%) from the transmittance ("transparency" in FIG. 18) of the object to reduce the transmittance gradually until the transmittance ("transparency") of the object becomes the original transmittance ("Tmin" in FIG. 18, for example, 50%) or less (S311, S312).

Here, the value of the above-mentioned "fadespeed" may be appropriately set in accordance with the size of the object, the change speed of a point of gaze of the user, and the like. For example, in the case where the size of the object is large, since it may be considered to tend to attract a user's attention, the value of "fadespeed" may be made small (the transmittance is changed slowly so as to return to the original state). Further, in the case where the change speed of the point of gaze is large (a user has changed the point of gaze onto the virtual screen suddenly), since it is considered that there is an intention to confirm the object, the value of "fadespeed" may be made large (the transmittance is changed quickly so as to return to the original state).

On the other hand, when the property of an object is "2", the control section 11 (display control section 11e) executes restoration processing of the display position of the object (S305). At this time, the display position of the object may be changed instantly to the original display position. However, if the display position is changed instantly, there is a fear to attract a user's attention. On the other hand, the transmittance of the object may be returned instantly to the original transmittance. However, if the transmittance is returned instantly, there is a fear to attract a user's attention. Then, in the present example, in accordance with the flowchart shown in FIG. 19, the object is moved to the original display position while the transmittance of the object is decreased gradually.

Figure 19:
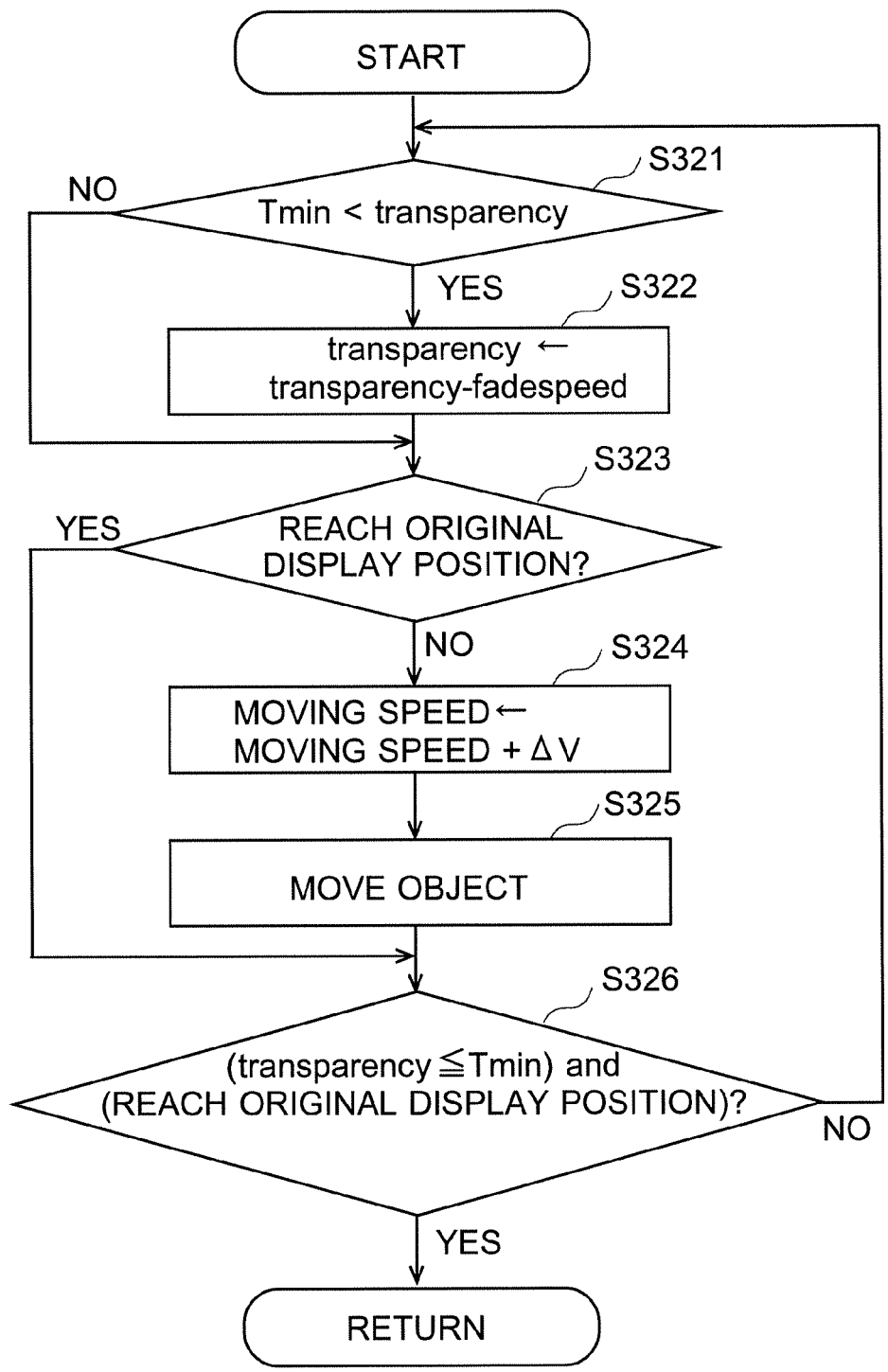
FIG. 19 is a flowchart illustrating operations (restoration processing of the display position of an object) of the transmission type HMD according to the one embodiment of the present invention.

In concrete terms, as illustrated in FIG. 19, the control section 11 (display control section 11e) judges whether the transmittance ("transparency" in FIG. 19) of the object is larger than a predetermined transmittance ("Tmin" in FIG. 19) (S321). When the transmittance ("transparency") of the object is the predetermined transmittance ("Tmin") or more, the control section 11 (display control section 11e) subtracts a predetermined value ("fadespeed") from the transmittance ("transparency") of the object (S322). Next, the control section 11 (display control section 11e) judges whether the object has reached the original display position (S323). When the object has not reached the original display position, the control section 11 adds up a predetermined value ("$\Delta V$") to "moving speed" of the object (S324), and the object is moved at "moving speed" to which "$\Delta V$" has been added (S325). Successively, the control section 11 (display control section 11e) judges whether the transmittance ("transparency") of the object is the predetermined transmittance ("Tmin") or less and whether the object has reached the original display position (S326). Then, when the transmittance ("transparency") of the object is larger than the predetermined transmittance ("Tmin"), or when the object has not reached the original display position, the control section 11 returns to S321, and repeats the same processes.

Here, in FIG. 19, the object is moved while the transmittance of the object is decreased gradually. However, the transmittance of the object may be returned instantly, and only the display position of the object may be moved gradually. Alternatively, the transmittance of the object may be returned gradually, and the display position of the object may be moved instantly. Further, the value of each of the above-mentioned "fadespeed" and "$\Delta V$" may be appropriately set in accordance with the size of the object, the change speed of a point of gaze of the user, and the like. For example, in the case where the size of the object is large, since it may be considered to tend to attract a user's attention, the value of each of "fadespeed" and "$\Delta V$" may be made small (the transmittance is decreased slowly, and the object is moved slowly). Further, in the case where the change speed of the point of gaze is large (the user has changed the point of gaze onto the virtual screen suddenly), since the possibility that the user intends to confirm the object quickly is high, the value of each of "fadespeed" and "$\Delta V$" may be made large (the transmittance and the display position are returned quickly to the original state).

The present invention should not be limited to the above-mentioned embodiments and examples, and the constitution of the information display system and the transmission type HMD 10 and the control method of the transmission type HMD 10 can be modified appropriately unless the modification deviates from the meaning of the present invention.

For example, in the above-mentioned example, the case of increasing the transmittance of an object is exemplified as a change of the display mode of an object. However, in place of the control process to increase the transmittance, or in addition to the control process to increase the transmittance, the control may be made to reduce the size of the object, to reduce the thickness of characters of the object being a text object, to shorten the display period in time of the object, or to display partially the object. Further, in the above-mentioned example, there was provided an example that, under the condition that, after the display position and/or the display mode of an object has been changed, the gaze point detecting section 11a has detected a movement of the point of gaze of a user, the control section may restore the display position and/or the display mode of the object to the original state, in response to the control section (second judgment section 11c) having determined that the sight-line region of the user and the display position of the object do not overlap with each other.

Further, when displaying an object on a lens or a glass of each item of glasses, sunglasses, and goggles by using the display and projection section 18, an object may be displayed on two right-and-left lenses or glasses, or an object may be displayed only on one of lenses or glasses.

Furthermore, in the above-mentioned example, description was given to a wearable transmission type HMD 10 which is made in a single body with glasses, sunglasses, goggles, a hat, or the like. However, if a positional distance between the both eyes of a user and a virtual screen can be kept constant, the above-described display control method can be applied similarly to an apparatus (transmission type HUD etc.) fixed to an instrument.

The invention claimed is:

1. An information display system comprising:
a transmission type head-mounted display including
a display and projection section configured to display an object on a virtual screen with superimposing the object on a background, and
an imaging section configured to take an image of both eyes of a user;
a control section for controlling the transmission type head-mounted display, the control section including
a gaze point detecting section configured to detect a point of gaze of the user by using image data of the both eyes of the user taken by the imaging section,
a first judgment section configured to, by using the point of gaze, judge whether the user gazes at a certain area on the virtual screen or the user gazes on a background beyond the virtual screen,
a second judgment section configured to judge whether a sight-line region overlaps with a display position of the object on the virtual screen or not, the sight-line region being a region around an intersection of the virtual screen and a line connecting a midpoint of the both eyes and the point of gaze, and
a display control section configured to, in response to a movement of the point of gaze, make a change of the object in at least one of a display position and a display mode on a basis of judgment results of the first judgment section and the second judgment section; and
a storage section storing an object property table in which each object displayed on the virtual screen and a property of the each object are associated with each other,
wherein the display control section is configured to make the change of the object on the first judgment section judging that the user gazes on the background beyond the virtual screen and the second judgment section judging that the sight-line region overlaps with the display position of the object,
wherein the control section further includes a third judgment section configured to, by using the object property table, judge whether the object overlapping with the sight-line region has a first property indicating that the object is to be displayed in consideration of the background or has a second property indicating that the object is to be displayed regardless of the background, and
the display control section is configured to make the change of the object in the at least one of the display position and the display mode further on the third judgment section judging that the object has the second property.

2. The information display system of claim 1,
wherein the display control section is configured to make the change of the object in the display mode on the third judgment section judging that the object has the first property.

3. The information display system of claim 1,
wherein making the change of the object in the display position is moving the object so as to keep the display position of the object from overlapping with the sight-line region, and
making the change of the object in the display mode is one or more of increasing the object in transmittance, reducing the object in size, reducing thickness of characters in the object, reducing a display period in time of the object, and displaying the object partially.

4. An information display system comprising:
a transmission type head-mounted display including
a display and projection section configured to display an object on a virtual screen with superimposing the object on a background, and
an imaging section configured to take an image of both eyes of a user; and
a control section for controlling the transmission type head-mounted display, the control section including
a gaze point detecting section configured to detect a point of gaze of the user by using image data of the both eyes of the user taken by the imaging section,
a first judgment section configured to, by using the point of gaze, judge whether the user gazes at a certain area on the virtual screen or the user gazes on a background beyond the virtual screen,
a second judgment section configured to judge whether a sight-line region overlaps with a display position of the object on the virtual screen or not, the sight-line region being a region around an intersection of the virtual screen and a line connecting a midpoint of the both eyes and the point of gaze, and
a display control section configured to, in response to a movement of the point of gaze, make a change of the object in at least one of a display position and a display mode on a basis of judgment results of the first judgment section and the second judgment section,
wherein the display control section is configured to make the change of the object on the first judgment section judging that the user gazes on the background beyond the virtual screen and the second judgment section judging that the sight-line region overlaps with the display position of the object,
wherein the display control section is configured to, under a condition that the gaze point detecting section has detected a movement of the point of gaze of the user after the display control section has made the change of the object in the at least one of the display position and the display mode, restore the at least one of the display position and the display mode of the object to an original state, on the first judgment section judging that the user gazes at a certain area on the virtual screen or the second judgment section judging that the sight-line region do not overlap with the display position of the object.

5. The information display system of claim 4,
wherein the display control section is configured to restore the at least one of the display position and the display mode of the object to the original state under a condition that a predetermined flag is set, the predetermined flag indicating that the change of the at least one of the display position and the display mode of the object has been made.

6. The information display system of claim 4,
wherein making the change of the object in the display position is moving the object so as to keep the display position of the object from overlapping with the sight-line region, and making the change of the object in the display mode is one or more of increasing the object in transmittance, reducing the object in size, reducing thickness of characters in the object, reducing a display period in time of the object, and displaying the object partially.

7. An information display system comprising:
a transmission type head-mounted display including
a display and projection section configured to display an object on a virtual screen with superimposing the object on a background, and
an imaging section configured to take an image of both eyes of a user; and
a control section for controlling the transmission type head-mounted display, the control section including
a gaze point detecting section configured to detect a point of gaze of the user by using image data of the both eyes of the user taken by the imaging section,
a first judgment section configured to, by using the point of gaze, judge whether the user gazes at a certain area on the virtual screen or the user gazes on a background beyond the virtual screen,
a second judgment section configured to judge whether a sight-line region overlaps with a display position of the object on the virtual screen or not, the sight-line region being a region around an intersection of the virtual screen and a line connecting a midpoint of the both eyes and the point of gaze, and
a display control section configured to, in response to a movement of the point of gaze, make a change of the object in at least one of a display position and a display mode on a basis of judgment results of the first judgment section and the second judgment section,
wherein the display control section is configured to, in making the change of the object in the at least one of the display position and the display mode or restoring the at least one of the display position and the display mode to the original state, gradually change the at least one of the display position and the display mode,
wherein the display control section is configured to increase or decrease a change speed of the at least one of the display position and the display mode, corresponding to a change speed of the point of gaze.

8. The information display system of claim 7,
wherein making the change of the object in the display position is moving the object so as to keep the display position of the object from overlapping with the sight-line region, and
making the change of the object in the display mode is one or more of increasing the object in transmittance, reducing the object in size, reducing thickness of characters in the object, reducing a display period in time of the object, and displaying the object partially.

9. A non-transitory computer-readable storage medium storing a display control program to be executed in a control apparatus for controlling a transmission type head-mounted display, the transmission type head-mounted display including a display and projection section configured to display an object on a virtual screen with superimposing the object on a background and an imaging section configured to take an image of both eyes of a user, the display control program, when being executed by a processor of the control apparatus, causing the processor to perform processes comprising:
detecting a point of gaze of the user by using image data of the both eyes of the user taken by the imaging section;
making a first judgment, by using the point of gaze, whether the user gazes at a certain area on the virtual screen or the user gazes on a background beyond the virtual screen;
making a second judgment whether a sight-line region overlaps with a display position of the object on the virtual screen or not, the sight-line region being a region around an intersection of the virtual screen and a line connecting a midpoint of the both eyes and the point of gaze; and
in response to a movement of the point of gaze, making a change of the object in at least one of a display position and a display mode on a basis of results of the first judgment and the second judgment,
wherein the change of the object is made on obtaining a result of the first judgment that the user gazes on the background beyond the virtual screen and a result of the second judgment that the sight-line region overlaps with the display position of the object,
wherein the processes further comprises making a third judgment, by using an object property table in which each object displayed on the virtual screen and a property of the each object are associated with each other, whether the object overlapping with the sight-line region has a first property indicating that the object is to be displayed in consideration of the background or has a second property indicating that the object is to be displayed regardless of the background, the object property table being stored in a storage section in advance, and
the making the change of the object includes making the change of the object in the at least one of the display position and the display mode on further obtaining a result of the third judgment that the object has the second property.

10. The non-transitory computer-readable storage medium of claim 9,
wherein the making the change of the object includes making the change of the object in the display mode on obtaining a result of the third judgment that the object has the first property.

11. The non-transitory computer-readable storage medium of claim 9,
wherein making the change of the object in the display position is moving the object so as to keep the display position of the object from overlapping with the sight-line region, and
making the change of the object in the display mode is one or more of increasing the object in transmittance, reducing the object in size, reducing thickness of characters in the object, reducing a display period in time of the object, and displaying the object partially.

12. A non-transitory computer-readable storage medium storing a display control program to be executed in a control apparatus for controlling a transmission type head-mounted display, the transmission type head-mounted display including a display and projection section configured to display an object on a virtual screen with superimposing the object on a background and an imaging section configured to take an image of both eyes of a user, the display control program, when being executed by a processor of the control apparatus, causing the processor to perform processes comprising:
detecting a point of gaze of the user by using image data of the both eyes of the user taken by the imaging section;
making a first judgment, by using the point of gaze, whether the user gazes at a certain area on the virtual screen or the user gazes on a background beyond the virtual screen;

making a second judgment whether a sight-line region overlaps with a display position of the object on the virtual screen or not, the sight-line region being a region around an intersection of the virtual screen and a line connecting a midpoint of the both eyes and the point of gaze: and in response to a movement of the point of gaze, making a change of the object in at least one of a display position and a display mode on a basis of results of the first judgment and the second judgment, wherein the change of the object is made on obtaining a result of the first judgment that the user gazes on the background beyond the virtual screen and a result of the second judgment that the sight-line region overlaps with the display position of the object, and wherein, the processes further comprises, under a condition that a movement of the point of gaze of the user has been detected after the change of the object in the at least one of the display position and the display mode has been made, restoring the at least one of the display position and the display mode of the object to an original state, on obtaining a result of the first judgment that the user gazes at a certain area on the virtual screen or a result of the second judgment that the sight-line region do not overlap with the display position of the object.

13. The non-transitory computer-readable storage medium of claim 12,
wherein the at least one of the display position and the display mode of the object is restored to the original state under a condition that a predetermined flag is set, the predetermined flag indicating that the change of the at least one of the display position and the display mode of the object has been made.

14. A non-transitory computer-readable storage medium storing a display control program to be executed in a control apparatus for controlling a transmission type head-mounted display, the transmission type head-mounted display including a display and projection section configured to display an object on a virtual screen with superimposing the object on a background and an imaging section configured to take an image of both eyes of a user, the display control program, when being executed by a processor of the control apparatus, causing the processor to perform processes comprising:

detecting a point of gaze of the user by using image data of the both eyes of the user taken by the imaging section;

making a first judgment, by using the point of gaze, whether the user gazes at a certain area on the virtual screen or the user gazes on a background beyond the virtual screen;

making a second judgment whether a sight-line region overlaps with a display position of the object on the virtual screen or not, the sight-line region being a region around an intersection of the virtual screen and a line connecting a midpoint of the both eyes and the point of gaze: and in response to a movement of the point of gaze, making a change of the object in at least one of a display position and a display mode on a basis of results of the first judgment and the second judgment, wherein, in making the change of the object in the at least one of the display position and the display mode or restoring the at least one of the display position and the display mode to the original state, the at least one of the display position and the display mode is gradually changed, and wherein a change speed of the at least one of the display position and the display mode is increased or decreased corresponding to a change speed of the point of gaze.

\* \* \* \* \*